United States Patent [19]

Hopewell

[11] Patent Number: 4,717,408
[45] Date of Patent: Jan. 5, 1988

[54] PROCESS FOR PREVENTION OF WATER BUILD-UP IN CRYOGENIC DISTILLATION COLUMN

[75] Inventor: Richard B. Hopewell, Medfield, Mass.

[73] Assignee: Koch Process Systems, Inc., Westboro, Mass.

[21] Appl. No.: 892,920

[22] Filed: Aug. 1, 1986

[51] Int. Cl.$^4$ ............................................. F25J 3/08
[52] U.S. Cl. ............................................. 62/20; 62/18
[58] Field of Search ...................... 62/18, 20; 55/68, 74

[56] References Cited

U.S. PATENT DOCUMENTS

| | | | |
|---|---|---|---|
| 2,672,034 | 3/1954 | Morrow | 62/18 X |
| 3,038,315 | 6/1962 | Colton | 62/20 |
| 3,163,511 | 12/1964 | Linde et al. | 62/18 |
| 3,633,371 | 1/1972 | Davison | 62/20 X |
| 4,428,759 | 1/1984 | Ryan et al. | 62/20 X |
| 4,444,576 | 4/1984 | Ryan et al. | 62/20 |
| 4,462,814 | 7/1984 | Holmes et al. | 62/20 X |
| 4,595,404 | 6/1986 | Ozero et al. | 62/18 |

Primary Examiner—Steven E. Warner
Attorney, Agent, or Firm—Richard P. Crowley

[57] ABSTRACT

A process by which a vapor side product stream is taken from the bottom section of a cryogenic distillation column, such as a propane or ethane recovery column, which process optionally employs a nonpolar liquid additive for use in the separation of acid gases from a hydrocarbon feed stream. The withdrawal of the vapor side stream prevents the build-up of water in the column which would ordinarily lead to free-water formation or the formation of solid hydrates in the cryogenic distillation column.

20 Claims, 1 Drawing Figure

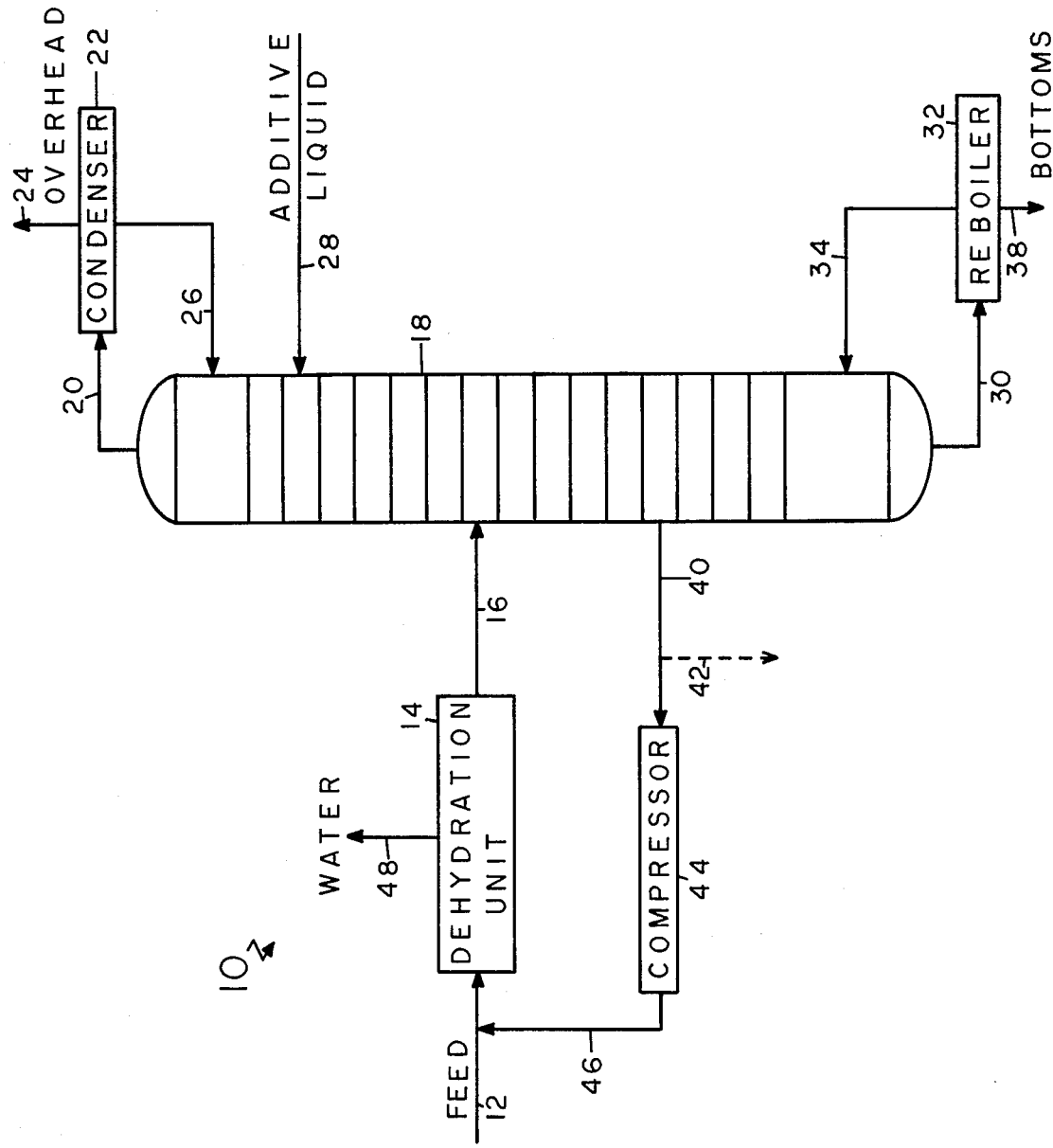

PROCESS FOR PREVENTION OF WATER BUILD-UP IN CRYOGENIC DISTILLATION COLUMN

BACKGROUND OF THE INVENTION

A fundamental problem in the operation of cryogenic distillation processes for the separation of an acid gas-containing hydrocarbon feed stream is the formation of free-water and/or solid hydrates in the cryogenic distillation column. For example, in the cryogenic distillation process known as the Ryan/Holmes process (see U.S. Pat. No. 4,462,814 issued July 31, 1984, hereby incorporated by reference) a build-up of water may occur in the ethane or propane recovery distillation columns of the system.

In the normal cryogenic distillation processing, for example with the Ryan/Holmes process, the water entering the Ryan/Holmes process with the feed gas must exit with the bottom product. The amount of water which is able to leave by the bottom product is related to the total acid gas content of the bottom product, such as the carbon dioxide and hydrogen sulfide content, with the result that either a low feed gas water concentration of less than 5 ppm, or a high bottoms acid gas content of greater than 0.1 mole percent, must be employed. A low feed gas water concentration requires specialized techniques to be employed other than the conventional tetraethylene glycol (TEG) dehydrating, such as the use of "cold-finger" or stripping gas processes or even molecular sieve or other specialized dehydration. High bottoms acid gas content requires additional downstream acid gas removal processing which is also undesirable.

In the cryogenic distillation systems employing a hydrocarbon feed gas, typically the temperatures at or near the top of a column provide for high liquid phase water concentration. The water vapor is absorbed into the descending liquid phase and enters the lower part of the column. The cryogenic distillation column also generally employs a reboiler and typically the temperatures in the bottom section are sufficiently high to force the water back into the vapor phase. Thus, in the cryogenic distillation system, the water cannot go out either with the overhead stream or the bottom stream, but builds up to form a separate liquid free-water layer or solid hydrates within the cryogenic distillation column. In order to solve this problem, some cryogenic distillation columns have a water draw off tray in about the middle of the column for decanting the water, and the water draw off tray requires a periodical drawing off of liquid water.

However, in the presence of acid gases in the distillation column, such as carbon dioxide and hydrogen sulfide, the presence of water leads to a corrosive environment, so that materials of construction of the column must be substantially upgraded to prevent corrosion. In some columns, the presence of water could form solid hydrates, such as for example, water carbon dioxide or water hydrocarbon hydrates. Water hydrates can be formed with hydrocarbon feed streams in columns containing temperatures as high as up to 60° F., but typically the problem is more acute at temperatures of 50° F. or below. Thus, if water is not removed from the cryogenic distillation column, it forms a liquid water phase on the distillation tray above the distillation tray where the maximum water vapor concentration occurs, and therefore, leads to the use of a water draw off tray to remove periodically the liquid water.

It is therefore desirable to provide a simple, effective and efficient system to prevent free-water formation in a cryogenic distillation column.

SUMMARY OF THE INVENTION

The present invention relates to a process for the prevention of free-water formation and/or solid hydrates build-up in a cryogenic distillation column in which the water concentration increases to super-saturation in the column.

The invention relates to a process for the separation of a feed stream in a cryogenic distillation column wherein the water accumulates to form free-water and/or solid hydrates in said column during the process, and wherein a water vapor stream is withdrawn and in one embodiment recycled to upstream of the feed to the cryogenic distillation column where the water content may be reduced to that of the existing feed stream. The water vapor stream withdrawal is taken at the location of maximum water vapor concentration in the distillation column, and more typically occurs at the distillation tray immediately below the tray wherein free-water formation would occur. The withdrawal rate of the water vapor stream is adjustable to reflect the design of the dehydration system used for the feed stream in the cryogenic distillation column and the design of the downstream acid gas removal system employed.

In particular, the invention concerns a process for the separation of a hydrocarbon-containing feed stream, and typically one containing acid gas components, such as the Ryan/Holmes cryogenic separation system, employing a nonpolar liquid additive in a cryogenic distillation column wherein water accumulates and said column during the process. The process comprises separating the said feed stream in said column into an overhead stream and a bottom stream and withdrawing from said distillation column a water vapor stream which is higher in water vapor concentration than the water vapor concentration of the feed stream introduced into the cryogenic column.

The process is particularly useful in, but not limited to: cryogenic distillation columns operating at a temperature of about 50°–60° F., or less, typically 32° F. or lower; and wherein the feed stream comprises a carbon dioxide or hydrogen sulfide-containing hydrocarbon feed stream, while the overhead stream comprises an enriched acid gas overhead stream and the bottom stream comprises an ethane or propane plus bottom stream. Even more particularly, the process is adapted for use with the Ryan/Holmes process wherein a nonpolar liquid additive is introduced into the upper section of the column or into the overhead condenser of the cryogenic column, such as the employment of an additive stream of a $C_4+$ stream into the column.

Typically, cryogenic systems usually have a feed gas dehydration system to control the amount of water in the feed gas introduced into the column, such dehydration system may comprise, for example, the use of triethylene glycol. The process includes in one embodiment withdrawing the water vapor stream from said column then recycling the water vapor stream upstream of or into the feed gas dehydrator which dehydrates the feed stream to a defined water concentration. Of course, the process may include merely withdrawing the water vapor stream from said column and discarding the stream or otherwise processing the stream.

Generally, the process involves withdrawing the water vapor stream from said column between the inlet of said feed stream and the outlet of the said bottom stream and at a location at about the maximum water vapor concentration in the distillation column. The amount of the withdrawn water vapor stream may vary, but typically may include, for example, from about 0.5 to 5 moles per 100 moles of the feed stream, for example, about 1 to 2.5 moles per 100 moles of the feed stream introduced into the cryogenic distillation column. Generally the water vapor stream is withdrawn from the distillation tray or section of the column or multiple sections, if desired, wherein the water vapor concentration in the column is higher than about 1000 ppm, for example, 2000 ppm or greater, and typically at a temperature ranging from about 150°–250° F., for example, 160°–200° F.

This invention will be described for the purposes of illustration only in connection with certain embodiments; however, it is recognized that various changes, additions, improvements and modifications may be made by those persons skilled in the art, all falling within the spirit and scope of the invention of the process.

BRIEF DESCRIPTION OF THE DRAWING

The drawing is a schematic, illustrative sketch of a cryogenic distillation system which illustrates the prevention of water build-up in the cryogenic distillation column by the withdrawal of a water vapor stream.

DESCRIPTION OF THE EMBODIMENTS

The drawing relates to a cryogenic distillation system 10 in which a water-containing hydrocarbon $C_1$, $C_2+$, $H_2S$ and $CO_2$ feed stream is introduced from a feed line 12 into a dehydrator 14, such as a triethylene glycol dehydrator, wherein the feed stream is reduced to a defined water concentration, and the excess water discharged through line 48. The dehydrated feed stream is then introduced through line 16 into a cryogenic distillation column 18 containing a plurality of distillation trays wherein an overhead stream is removed through line 20 and directed to a condenser 22 and a portion recycled through line 26 to the upper portion of the distillation column 18, while an overhead stream is removed through line 24. In the cryogenic distillation system 10 illustrated, a nonpolar liquid additive, such as, for example, a butane plus liquid additive stream, is introduced through line 28 into the upper portion of the column to prevent freeze-up in the column and to also enhance the volatility of the acid gas components in the column, or to break the ethane/carbon dioxide azeotrope in the column. The bottom stream is removed through line 30, reboiled in a reboiler 32 and a portion recycled through line 34 to the bottom of the column, and the bottom stream is withdrawn through line 38.

At a point in the cryogenic distillation column 18, and typically below the distillation tray where free liquid water formation would occur and at a point of maximum water vapor concentration, a water vapor stream is removed through line 40 and optionally may be discarded as illustrated by the dotted line 42, but in the illustrated embodiment the withdrawn vapor stream is then compressed in compressor 44 and recycled through line 46 into the feed line 12. The water concentration in the withdrawn vapor stream is higher than that of the feed stream, and the water vapor stream is introduced with the feed stream into the dehydration unit 14 and excess water removed through line 48.

The drawing thus illustrates a simple recycle process 10 in a cryogenic distillation system where a water vapor stream is withdrawn 40 at a point of about maximum water concentration in the cryogenic column 18 between the feed inlet and the bottom outlet to prevent water build-up in the bottoms of the cryogenic distillation column.

Computer simulation of an acid gas hydrocarbon-containing feed stream in a Ryan/Holmes process has been carried out using the process simulation program of Simulation Sciences, Inc. of Fullerton, Calif., Version 1.01. The vapor-liquid equilibria and thermodynamic data were calculated based upon the Peng-Robinson equation of state and water solubility data taken from the published literature.

The computer simulation data is illustrated in the following table:

TABLE I

| | FLOW RATES (Lb moles/hr) | | | | | |
|---|---|---|---|---|---|---|
| | Stream No. | | | | | |
| | 12 FEED | 40 VAPOR DRAW RECYCLE | 48 WATER | 16 DEHYDRATED FEED AND RECYCLE | 28 $C_4+$ ADDITIVE LIQUID | 24 OVERHEAD | 38 BOTTOMS |
| $H_2O$ | 31.06 | 0.56 | 31.01 | 0.61 | — | — | 0.05 |
| $H_2S$ | 6.04 | 0.66 | — | 6.70 | — | 5.27 | 0.77 |
| $CO_2$ | 10144.64 | 126.30 | — | 10270.94 | — | 10136.91 | 7.73 |
| $N_2$ | 415.45 | — | — | 415.45 | — | 415.45 | — |
| $C_1$ | 809.16 | 0.04 | — | 809.20 | — | 809.16 | — |
| $C_2+$ | 701.67 | 53.59 | — | 755.26 | 1497.52 | 220.86 | 1978.33 |
| TOTAL | 12108.02 | 181.15 | 31.01 | 12258.16 | 1497.52 | 11587.65 | 1986.88 |
| Temp, °F. | 100.0 | 154.5 | 100.0 | 100.0 | 10.0 | −1.8 | 335.3 |
| Press., PSIA | 370.0 | 351.0 | 14.7 | 350.0 | 350.0 | 340.0 | 352.0 |
| $H_2O$, ppm | 2565 | 3091 | — | 50 | Nil | Nil | 25 |

The cryogenic distillation process as illustrated in the table shows that the withdrawal of the water vapor and the recycle of the water vapor to the feed stream prevents the water build-up in the bottoms of the said column. Where the water vapor stream is not withdrawn, that is, under conventional practice with the same feed stream and operating conditions, free-water accumulation would occur and a water draw down tray would be required or the process would be limited to a very low dehydrated feed stream or to a very high acid gas bottoms stream.

What is claimed is:

1. In a process for the separation of a hydrocarbon and acid gas containing feed stream in a cryogenic distillation column, a zone of said column which is operated at a temperature of 60° F. or less, wherein free water accumulates or forms hydrates in said column from water vapor in the feed stream during the cryogenic process, and which process comprises separating the said feed stream in said column into an overhead stream and a bottom stream, the improvement which comprises:

withdrawing a hydrocarbon and acid gas vapor stream which stream is enriched in water vapor with respect to said feed stream, thereby preventing the excess accumulation of free water or the formation of hydrates in said cryogenic column.

2. The process of claim 1 which includes dehydrating the withdrawn vapor stream and recycling the dehydrated vapor stream into said distillation column.

3. The process of claim 1 wherein said distillation column is a cryogenic distillation column operating at a temperature of about 0° F. or lower, and wherein the feed stream comprises a carbon dioxide containing hydrocarbon feed stream; the overhead comprises an enriched carbon dioxide overhead stream; and the bottom stream comprises a $C_2+$ bottom stream.

4. The process of claim 1 wherein said distillation column is a cryogenic distillation column operating at a temperature of about 0° F. or lower, and wherein the feed stream comprises a carbon dioxide containing hydrocarbon feed stream; the overhead stream comprises an enriched carbon dioxide overhead stream; and the bottom stream comprises a $C_3+$ bottom stream.

5. The process of claim 1 which includes dehydrating the withdrawn vapor stream and recycling the withdrawn, dehydrated vapor stream into the said feed stream.

6. The process of claim 1 which includes withdrawing the vapor stream enriched in water vapor from the said column between the inlet of the said feed stream and the outlet of the said bottom stream and at a location of about maximum water vapor concentration in said column.

7. The process of claim 1 which includes withdrawing from about 0.5 to 5.0 moles of the said vapor stream enriched in water vapor per 100 moles of said feed stream.

8. The process of claim 1 wherein the withdrawn vapor stream enriched in water vapor has a temperature of about 150° F. to 200° F.

9. The process of claim 1 which includes withdrawing the said enriched water vapor stream from a distillation tray in said distillation column immediately below the distillation tray wherein free-water formation would occur.

10. The process of claim 1 wherein the said withdrawn vapor stream has a water vapor of about 1000 ppm or greater.

11. The process of claim 1 wherein the said feed stream has a water vapor concentration of 5 ppm or greater, or the bottom stream has an acid gas concentration of 0.1 mole percent or less.

12. The process of claim 1 which includes introducing a nonpolar liquid additive stream into the said column.

13. The process of claim 12 wherein the additive stream comprises a $C_4+$ stream.

14. The process of claim 1 wherein the feed stream comprises a carbon dioxide and hydrogen sulfide containing hydrocarbon feed stream and wherein the overhead stream is a carbon dioxide enriched stream and the bottom stream is a hydrogen sulfide enriched bottom stream.

15. The process of claim 14 which includes introducing a nonpolar liquid additive stream into the upper section of said column and wherein the bottom stream includes the liquid additive.

16. In a cryogenic process of the separation of an acid gas containing hydrocarbon feed stream in a cryogenic distillation column, a zone of said column which is operated at a temperature of 60° F. or less, where free water accumulates or forms hydrates in said column from water vapor in the feed stream and the feed stream contains more than about 5 ppm of water vapor during the cryogenic process, and which process comprises separating the said feed stream in said column into a carbon dioxide enriched overhead stream and a $C_2$ or $C_3+$ enriched bottom stream, the improvement which comprises:

(a) withdrawing from said cryogenic distillation column a hydrocarbon and carbon dioxide gas vapor stream which is enriched in water vapor with respect to said feed stream and contains more than about 1000 ppm of water vapor and withdrawing the said vapor stream between the feed inlet of said column and the outlet of the bottom stream of said column at a location in said column wherein the water vapor concentration is about at the maximum concentration;

(b) dehydrating the withdrawn vapor stream to a water vapor concentration of about or less than the water vapor concentration of the feed stream introduced into said column; and (c) recycling from about 0.5 to 5.0 moles of the dehydrated vapor stream per 100 moles of the feed stream into said column, thereby preventing the accumulation of free water or the formulation of hydrates in said column during the cryogenic process.

17. The process of claim 16 which includes introducing a $C_4+$ liquid additive stream into the upper portion of the said distillation column or the overhead condenser and withdrawing the liquid additive additive stream with the bottom stream.

18. The process of claim 16 wherein the withdrawn vapor stream has a temperature of about 150° F. to 250° F. and has a water vapor concentration as withdrawn of about 2000 ppm or greater.

19. The process of claim 16 which includes compressing the dehydrated, withdrawn vapor stream prior to recycling the dehydrated stream into said column.

20. The process of claim 19 which includes recycling the compressed, dehydrated, withdrawn vapor stream upstream of the said feed stream.

* * * * *